(12) United States Patent
Koukios

(10) Patent No.: US 10,781,390 B2
(45) Date of Patent: *Sep. 22, 2020

(54) METHOD OF PRODUCTION OF FUELS FROM BIOMASS, FROM LOW QUALITY COALS AND FROM WASTES, RESIDUES AND SLUDGES FROM SEW AGE TREATMENT PLANTS

(71) Applicant: Thermorefinery Technologies Inc, New York, NY (US)

(72) Inventor: Emmanouil Koukios, Agla Paraskevi (GR)

(73) Assignee: Thermorefinery Technologies Inc., New York, NY (US)

( * ) Notice: Subject to any disclaimer, the term of this patent is extended or adjusted under 35 U.S.C. 154(b) by 324 days.

This patent is subject to a terminal disclaimer.

(21) Appl. No.: 15/430,814

(22) Filed: Feb. 13, 2017

(65) Prior Publication Data

US 2017/0152455 A1 Jun. 1, 2017

Related U.S. Application Data

(63) Continuation of application No. 13/513,582, filed on Jun. 3, 2012, now Pat. No. 9,567,544.

(51) Int. Cl.
| | | |
|---|---|---|
| *C10L 9/00* | (2006.01) | |
| *C10L 9/02* | (2006.01) | |
| *C10L 5/44* | (2006.01) | |
| *C10L 5/40* | (2006.01) | |
| *C10L 9/08* | (2006.01) | |
| *C10B 53/02* | (2006.01) | |
| *C10L 5/04* | (2006.01) | |
| *C10B 57/08* | (2006.01) | |
| *C10L 5/46* | (2006.01) | |

(52) U.S. Cl.
CPC ............... *C10L 9/02* (2013.01); *C10B 53/02* (2013.01); *C10B 57/08* (2013.01); *C10L 5/04* (2013.01); *C10L 5/40* (2013.01); *C10L 5/406* (2013.01); *C10L 5/442* (2013.01); *C10L 5/445* (2013.01); *C10L 5/46* (2013.01); *C10L 9/083* (2013.01); *C10L 2290/02* (2013.01); *C10L 2290/08* (2013.01); *C10L 2290/545* (2013.01); *C10L 2290/547* (2013.01)

(58) Field of Classification Search
CPC ... C10L 9/02; C10L 9/083; C10L 5/44; C10G 1/02; C10G 1/047; C10G 2300/1003; C10G 2300/1011; C10G 2300/201; Y02E 50/10; Y02E 50/14; Y02E 50/15; Y02E 50/30; Y02P 30/20
See application file for complete search history.

(56) References Cited

U.S. PATENT DOCUMENTS

| | | | | |
|---|---|---|---|---|
| 4,119,410 A * | 10/1978 | Kindig | ............... | C10L 9/02 201/17 |
| 4,137,050 A * | 1/1979 | Grant | ............... | C10L 9/02 201/17 |
| 4,203,727 A * | 5/1980 | Simpson | ............... | C10L 9/02 423/578.2 |
| 4,304,571 A * | 12/1981 | McMahon | ............... | C10L 9/00 44/608 |
| 4,632,750 A * | 12/1986 | McGarry | ............... | B03D 1/008 209/166 |
| 5,192,338 A * | 3/1993 | Waugh | ............... | C10L 9/02 44/621 |
| 9,567,544 B2 * | 2/2017 | Koukios | ............... | C10G 1/02 |

* cited by examiner

*Primary Examiner* — Cephia D Toomer
(74) *Attorney, Agent, or Firm* — Soule Skokos; Skokos Law Group LLC

(57) ABSTRACT

The present invention concerns a method for the removal of inorganic components such as potassium, sodium, chlorine, sulfur, phosphorus and heavy metals, from biomass of rural or forest or urban origin or even mixture of different origin biomasses, from low quality coals such as peat, lignite and sub-bituminous/bituminous coals, from urban/industrial origin residues/wastes, which are possible to include as much organic—>5% weight—as inorganic—<95% weight— charge and from sewage treatment plant sludges. The desired goal is achieved with the physicochemical treatment of the raw material. The method can also include the thermal treatment, which can precede or follow the physicochemical one. The application of the thermal treatment depends on the nature and the particular characteristics of each raw material as well as on the feasibility analysis of the whole process in order to determine the optimization point in each case.

19 Claims, No Drawings

METHOD OF PRODUCTION OF FUELS FROM BIOMASS, FROM LOW QUALITY COALS AND FROM WASTES, RESIDUES AND SLUDGES FROM SEW AGE TREATMENT PLANTS

CROSS-REFERENCE TO RELATED APPLICATION

This U.S. Non-Provisional Patent Application claims the benefit of U.S. patent application Ser. No. 13/513,582, filed Jun. 3, 2012, entitled "METHOD OF PRODUCTION OF FUELS FROM BIOMASS, FROM LOW QUALITY COALS AND FROM WASTES, RESIDUES AND SLUDGES FROM SEWAGE TREATMENT PLANTS", the contents of which are expressly incorporated herein by this reference as though set forth in their entirety. U.S. patent application Ser. No. 13/513,582 claims the benefit of PCT Patent Application No. PCT/EP2011/05115, filed on Jan. 5, 2011, the contents of which are incorporated herein by reference in its entirety. PCT Patent Application No. PCT/EP2011/05115 claims the benefit of Greece Patent Application No. 20100100012, filed on Jan. 11, 2010, the contents of which are incorporated herein by reference in its entirety.

The present invention refers to a method for the pretreatment of raw materials, i.e. the removal of inorganic components including heavy metals from raw materials, in particular from biomass of agro/forest/urban origin or even mixture of biomasses of different origin, from low quality coals such as peat, lignite or sub-bituminous and/or bituminous coals, from urban and/or industrial origin residues and wastes and from sludges from sewage treatment plants, for the production of clean materials for thermochemical conversion aiming the production of energy and/or fuels. The inorganic components that are removed may be potassium, sodium, chlorine, sulfur and phosphorus and the heavy metals may be zinc, mercury, copper, lead and chromium. The urban and/or industrial origin residues and wastes may include as much organic—>5% weight—as inorganic—<95% weight—charge.

The problems that are caused nowadays during the thermochemical incineration, combustion, gasification and pyrolysis of biomass are mainly due to the composition of its ash that is contained in the biomass. These problems appear especially when biomass comes from agro, forest and urban environment such as the diverse straw types, and from agro-industrial residues such as cotton, olive, peanut, etc, as well as from tree trimmings and timbers used in building construction and furniture production. The ash of such biomass is very rich in alkali metals, chlorine, sulfur and phosphorus. Therefore, the produced gases, liquids and solids during the thermochemical biomass conversion tend to react with each other and with any other inorganic components that is present during the conversion as well as with the metal surfaces of the reactor causing corrosion, deposition and agglomeration problems. The conversion of the biomass also produce gas emissions, which result in great financial losses, environmental problems as well as in the inability to the use of the biomass in large scale, either alone or in combination with solid, liquid and gas fuels for energy, liquid fuels and chemicals production.

Similar problems appear during the use of low quality coals such as peat, lignite and sub-bituminous/bituminous coals, which are mainly used for large scale heat and power generation as well as during the thermochemical conversion of urban and industrial origin residues/wastes and sewage treatment plants sludges for their secure, economic and environmentally beneficial treatment/neutralization/disposal.

In particular the ash of the low quality coal fuels is also average to rich in alkali metals, chlorine and sulfur, whereby the ash composition differs depending on the coal quality and the specific characteristics of each coal deposit. This creates similar but of lower extent problems compared to the problems related to the use of biomass, which nevertheless lead to great financial losses, environmental problems, and limited efficiency in the use of such coals, as well as to problems in their application, as in the case of the gasification of lignite with high sodium and chlorine content, for energy and/or liquid fuels and chemicals production.

Furthermore, the ash of the urban/industrial origin residues/wastes as well as of the sewage treatment plant sludges is very rich in alkali metals, chlorine, sulfur, phosphorus as well as heavy metals e.g. zinc, lead, copper, chromium, etc. Therefore, the gases, liquids, and solids produced during the thermochemical conversion of the aforementioned residues/wastes or sludges tend to react with each other or with any other inorganic material present, as well as with the metal surfaces of the reactors causing corrosion, deposition, agglomeration and gas emissions problems. These phenomena are responsible for great financial losses, environmental problems, low conversion yields in a way that these technologies are not feasible unless they are subsidized as well as in the inability to the use of these specific residues/wastes types and sludges in large scale, either alone or in combination with other solid or gas fuels for the efficient energy, liquid fuels and chemical production. Moreover, the presence of a great amount of chlorine in the structure of polymer/plastic materials such as the polyvinylchloride (PVC), which constitutes a great percentage of the plastic materials that are contained in the solid residues/wastes, results in the production of great amounts of dioxins (PCDD) and fourans (PCDF), which are extremely harmful for the human health and all other kinds of life. The capture/destruction of these pollutants before they are emitted to the environment requires the application of expensive technologies with even the risk of a possible accident.

Solving the aforementioned problems, will result in the wider use of biomass for the production of energy, liquid fuels and chemicals as well as in the more economic and more efficient use of coals with large economic and environmental benefits, especially nowadays where the energy cost is increasing while there is an urgent need for the reduction of greenhouse gases from solid fuels to deal with the greenhouse effect. The widespread use of biomass and the more efficient use of low-quality coals, which are applied in energy generation, are expected to contribute decisively not only in the reduction of greenhouse gases, but also in the cost reduction of energy and fuel production.

In addition, regarding the case of urban and industrial origin residues/wastes as well as sewage treatment plants sludges, solving the aforementioned problems will result in the possibility of a wider use of these specific residues/wastes types and sludges in large scale, either alone or in combination with solid and gas fuels for power/heat generation, liquid fuels and chemicals production with large economic and environmental benefits. Moreover, it will contribute considerably in the environmental protection by preventing the deposition of this kind of materials in waste dumps and by reducing the energy import particularly nowadays where the imported energy cost appears to increase, while there is an urgent need for the reduction of greenhouse gases from solid fuels to deal with the greenhouse effect.

The currently applied techniques and methods to deal with these problems have only limited success and, as a consequence, the use of biomass in thermochemical conversion appears to be very limited worldwide and also restricted mainly in the use of feedstock such as wood, which causes the fewest problems. As far as the use of low-quality coals is concerned, the specific problems limit their thermochemical conversion efficiency and lead to the use of larger amounts of feedstock for the production of energy and fuels/chemicals, resulting in the increase of the greenhouse gas emissions and the financially non-efficient exploitation of the coal deposits with larger content of alkali metals, chlorine and sulfur. A method that relatively minimizes the aforementioned problems is described in PCT/EP2008/058220.

Furthermore, the thermochemical exploitation of urban/industrial origin residues/wastes as well as of the sewage treatment plant sludges using thermochemical incineration for the production primarily of heat and in a lower extent of electricity is a high-cost and low energy efficiency solution because of the problems that are caused by their ash composition and the presence of chlorine in the organic structure of the polymer materials. As a result, the percentage of the urban/industrial origin residues/wastes as well as of the sewage treatment plant sludges used in relation with this technology is relatively low and never exceeds 50-60% of the produced amounts.

The object of the present invention is to resolve the aforementioned problems, to improve the properties of the raw materials and to minimize and even eliminate gas emissions and corrosion deposition and agglomeration problems that are caused during their thermochemical conversion. The raw material can be biomass of agro/forest/urban origin or even mixture of biomasses of different origin, low quality coals such as peat, lignite or sub-bituminous and/or bituminous coals, urban and/or industrial origin residues and wastes, which are possible to include as much organic— >5% weight—as inorganic—<95% weight—charge and sewage treatment plants sludges. The present invention succeeds in the removal of the harmful components of the ash of agro/forest/urban origin biomass, of low-quality coals such as peat, lignite and sub-bituminous and bituminous coals and urban/industrial origin residues/wastes as well as sludges from sewage treatment plants, which harmful components can be alkali metals, chlorine, sulfur and phosphorus, heavy metals such as Cu, Pb, Zn, Cr, Hg and organic chlorine, which is present in the structure of polymer materials in case of residues/wastes from urban and industrial origin. The removal is carried out before the thermochemical conversion of the raw materials to upgrade the material, to minimize/eliminate corrosion, deposition, ash agglomeration problems as well as alkali metal emissions, chlorine, sulfur and heavy metals (Cu, Pb, Zn, Cr, Hg), dioxins and furans (PCDD, PCDF) emissions. Another goal of the invention is the production of low moisture, hydrophobic material, easy to be ground, and be mixed with various other materials at different ratios, easily applied in feeding systems used in commercial boilers for energy production and easily pelletized even combined With various other materials at different ratios at low energy consumption.

The invention is defined in independent claim 1. Features of the dependent claims give further advantages to the invention. The desired aim is achieved with the physicochemical pretreatment of the raw material. The method can also include the thermal process, which can be prior to or follow the physicochemical one. The application of the thermal pretreatment depends on the nature and the particular characteristics of each raw material.

According to the invention, the method for the removal of inorganic components from raw material for the production of clean materials, where raw material is biomass or coal or residues or wastes or sludges or any combination thereof, includes washing of raw material with aqueous solution that contains organic and/or inorganic salts. The washing of raw material can be carried out with aqueous solution that contains not only organic and/or inorganic salts but also organic and/or inorganic acids. Preferably the concentration of the salts in the aqueous solution or the concentration of salts and the acids in the aqueous solution, if the solution contains both salts and acids, varies from 0.1% to 30% w/w in water volume, with the best results being achieved when the concentration varies between 0.1% to 2% w/w in water volume Before or after washing, the raw material may suffer thermal pretreatment. According to an example of the invention, the removal of the inorganic components from the raw material is realized exclusively with washing and the raw material does not suffer thermal pretreatment.

The thermal pretreatment of the raw material can be realized in the absence of air, in nitrogen atmosphere at temperatures from 200° C. up to 350° C. for residence time in the specific temperature range that varies from 5 min till 2 h while the humidity of raw material should be lower than 30% in wet base. The best results can be achieved between 250° C. and 320° C. while the residence time in this specific temperature range varies from 5 till 40 min.

The thermal pretreatment of the raw material can also be realized in the absence of air, in nitrogen atmosphere and/or with the presence of a small oxygen/air amount, which is limited in less than 40% of the amount that is required for the stoichiometric oxidation of these materials.

The washing of the raw material can be carried out with aqueous solution that contains organic and/or inorganic aluminum or/and titanic salts. In another implementation of the invention, washing of the raw material is carried out in succession in different aqueous solutions. The water that is used for washing can be of any origin, e.g. from the public water supply system while washing can be realized at raw material to aqueous solution ratio from 33 g/l up to 600 g/l. This depends on the physicochemical characteristics of each raw material such as density, moisture content, particle size, etc.

The washing can be realized at raw material to aqueous solution ratio from 150 g/l up to 400 g/l, at temperature that varies from 13° C. up to 95° C., preferably from 55° C. up to 80° C., and washing time can vary from 5 min till 24 h, preferably from 10 min till 35 min while raw material is stirred in the reactor.

Raw material consists preferably of particles with size varying from some microns up to 10 cm but preferably with particle size smaller than 3 cm.

The description of embodiments of the invention and examples of application of methods according to the invention follows:

In the case biomass of agro/forest/urban origin or mixtures of biomasses of different origins, and of low quality coals such as peat, lignite or sub-bituminous and/or bituminous coals, clean biomass and coal free of alkali metals and chlorine and with much lower concentrations of sulfur, phosphorus and heavy metals such as zinc, lead, mercury, etc. are produced after these types of raw materials undergo physicochemical pretreatment. In this case the inorganic components are removed from the raw materials during the physicochemical pretreatment. In the case of urban/industrial origin residues/wastes, the thermal pretreatment removes the chlorine from the polymer materials structure, for the production of low moisture, hydrophobic, easy to be ground material, which is easily mixed with various other materials at different ratios, which may be easily applied in feeding systems used in commercial boilers for energy production and easily pelletized even combined with various other materials at different ratios at low energy consumption.

After the thermal/thermochemical stage, the produced material is characterized as biocoal, in case where biomass is the pretreated material, as synthetic coal in case where the pretreated material is residues or wastes or sewage treatment plant sludges, and as upgraded coal in case where the pretreated material is coals.

During the thermal/thermochemical process, the specific biomass types, the low-quality coals, the urban/industrial origin residues/wastes and the sludges from sewage treatment plants are heated in nitrogen atmosphere in the absence of air or with the presence of a small oxygen/air amount, which is limited in less than 40% of the amount that is required for the stoichiometric oxidation of these materials, at temperatures from 200° C. up to 350° C., with the best and most economically attractive results being achieved between 250° C. and 320° C., for time periods varying from 5 min to 2 h, with the best and most economically attractive results being achieved between 5 and 40 min residence time in this specific temperature range. The humidity of the pretreated material must be lower than 30% in wet basis for the successful pretreatment of the material. The particle size of the raw material can vary from some microns up to 15 cm in order for the pretreatment to have the best possible results. This thermal/thermochemical treatment, which is called prepyrolysis and in case of using oxygen/air low temperature pre-gasification, achieves the cracking of the organic structure of various biomass types, low quality coals, urban/industrial origin residues/wastes and sewage treatment plant sludges and their conversion into a material with higher fixed carbon, less volatile matter content while it produces a small amount of gases mainly consisting of water, carbon dioxide, carbon monoxide, as well as some light organic components, which may be burnt in a boiler or in an internal combustion engine. The heat and exhaust gases produced from this engine are used to cover the energy demand of prepyrolysis/pregasification, which by this way becomes energetically self sufficient. In addition, the overall chlorine content, under the form hydrochloride, from the organic structure of biomass and low quality coals while in case of urban/industrial origin residues/wastes the overall chlorine content in the organic structure of polyvinylchloride is released as gas-phase hydrochloride, which can be absorbed by suitable inorganic materials such as calcium oxide and magnesium oxide thus producing safe and inert chloride salts, preventing its release to the environment. For this reason, the produced gas stream goes through a reactor that contains the appropriate packing material such as calcium oxide and magnesium oxide for the particular bonding reaction.

The various biomass types, low quality coals, urban/industrial origin residues/wastes and sewage treatment plant sludges appear to have a mass loss varying from 5% to 40% dry basis depending on the applied conditions while in the optimal case less than 20%. The heating value loss varies from 5% to 30% and in the optimal conditions approximately 7-15%.

The prepyrolysis/pregasification stage can be realized with the use of different operational principle reactors, which are commercially available and are used for other purposes such as fluidized bed reactors, fixed bed reactors, centrifugal reactors, moving bed reactors etc.

During the application stage of the physicochemical pretreatment, the biomass types, the low quality coals, the sewage treatment plant sludges as well as the prepyrolysed/pregasified biomass sample from low quality coals, urban/industrial origin residues/wastes as well as from sewage treatment plant sludges are washed with an organic and/or inorganic aqueous solution.

The washing pretreatment is realized with the use of commercial reactors, which are in use in various industrial applications such as biomass hydrolysis, fermentation in case of bioethanol production as well as in each application that applies liquid/solid and/or liquid/liquid extraction.

With the help of a stirred system and/or an intense mixing of liquid/solid, a faster reaction is possible in order to remove effectively from the raw materials the alkali metals, chlorine, sulfur, phosphorus as well as the heavy metals with a smaller residence time of the raw material in the reactor.

Preferably the raw material has particle sizes that vary from some microns up to 3 cm while the best results are achieved for particle sizes smaller than 8 mm.

All water soluble organic—i.e. monocarbonic and/or polycarbonic, saturated and/or unsaturated, those having an aromatic ring such as citrus, malic, benzoic acid—as well as all the inorganic acids such as the phosphoric acid and nitric acid, may be combined with those from their calcium, magnesium, aluminum, titanium and ammonium salts that are water soluble. For the preparation of the aqueous solution for washing of the raw material the above mentioned soluble elements are mixed with water, whereby the weight of the soluble elements is preferably 0.1% to 30% of the weight of the water.

As an example, the aqueous solution may contain calcium acetate and/or magnesium acetate and/or aluminum acetate and/or ammonium acetate and/or titanic acetate salts, which may be in combination with acids, such as acetic acid.

The used proportions of organic and/or inorganic solvent vary from 0.1% until 30% weight in the aqueous solution. The best and most economical results can be achieved with proportions in the range 0.1% up to 2% weight (w/w).

These organic and/or inorganic acids such as acetic acid, nitric acid, etc. and those from their calcium, magnesium, aluminum, titanium and ammonium salts that are water soluble can be mixed with each other in proportions that vary from 0% up to 100% in order to form the active solvent that will be used in the preparation of the aqueous solution. In addition, they can be used for successive extractions so that the desired result is achieved.

It is essential, that the applied organic and/or inorganic acids are used in combination with some of their water soluble organic and/or inorganic salts so that the desired result is achieved while the water soluble organic and/or inorganic salts of the respective organic and/or inorganic acids may be used without the addition of organic and/or inorganic acid. The various salts and acids can be mixed in proportion of 0-100% provided that compatibility problems or undesirable reactions do not exist.

The reason that the organic and/or inorganic acids cannot be used without salts is that when they are used, they remove from the pretreated material apart from the problematic inorganic components such as alkali metals, chlorine, sulfur etc, and inorganic components such as calcium and magnesium, which are essential during the thermochemical conversion stage because of their catalytic activity for the conversion of fixed carbon and for the total conversion of the reacting material.

The proportions used during the extraction and the use or not of successive extractions depend on the kind and the composition of the raw material as well as on the desired properties of the p Bated material, such as ash composition, ash fusion point and ash content in the produced material. Any kind of tap water from a public water supply system, spring, river, lake, etc. can be used for the preparation of the aqueous solutions. The liquid to solid ratio can vary from 33 g/l up to 600 g/l at temperatures from 13° C. up to 95° C. and residence time varying from 5 min till 24 h. The optimal results can be achieved at liquid to solid ratio varying from 150 g/l up to 400 g/l at temperatures from 55° C. up to 80° C. and residence time varying from 10 min till 35 ruin, under intense stirring inside the reactor conditions of intense mixing of the raw material with the aqueous solution. The liquid to solid ratio, the pretreatment temperature and duration as well as the type and the concentration of the water soluble organic and/or inorganic solvent used depend on the various biomass types, the low quality coals, the urban/industrial origin residues/wastes as well as the sewage treatment plant sludges. During the pretreatment with the aqueous solution of organic and/or inorganic solvent that is prepared by mixing the respective water soluble organic and/or inorganic acids with the water soluble organic/inorganic salts, the water soluble alkali metals, sulfur, phosphorus, heavy metals (Cu, Pb, Zn, Cr, Hg), and chlorine are transferred into the aqueous phase and are removed from the pretreated material. These inorganic components have the form of chloride salts, sulfuric salts as well as carbonate salts, which are water soluble in a great extent and consequently are dissolved in the aqueous solvent under specific conditions.

Simultaneously, the alkali metals, sulfur, phosphorus, heavy metals (Cu, Pb, Zn, Cr, Hg), and chlorine that are found in the organic structure of compounds such as the carboxyl salts react with the organic and/or inorganic solvent that is formed by the mixing of the respective water soluble organic and/or inorganic acids with the water soluble organic/inorganic salts through ion exchange reactions and are replaced by hydrogen, calcium, magnesium, aluminum, ammonium, titanium ions in the organic material structure. At the same time, the organic and/or inorganic salts may replace hydrogen atoms in the structure of carboxylic compounds forming additional carboxylic, calcium, magnesium, aluminum, ammonium, titanium salts increasing in this way the calcium, magnesium, aluminum, titanium concentration in the ash of the pretreated material. This fact results in the increase of the ratio of the inorganic components that can act as catalysts during the thermochemical conversion process and can potentially increase the activity of the pretreated materials. Furthermore, it results in the increase of the concentration of inorganic components such as magnesium, aluminum, titanium and calcium, which considerably increases the ash fusion temperature of the pretreated material and eliminates fusion, agglomeration and corrosion problems. A quantity of inorganic solvent compounds in acidic environment such as carbonate salts and other are additionally removed due to the acidic character of the solution. After the end of the washing pretreatment, the material is dried combining mechanical separation processes so that the humidity in the pretreated material is decreased down to 40-55% on wet basis and afterwards is dried in rotating or other type dryers till the humidity is decreased in the required degree for further thermochemical conversion, in case of combustion, down to 10%, while in case of gasification down to 20% on wet basis.

In case where the physicochemical process precedes the thermal/thermochemical one, the pretreated material should be dried up to 30% weight on wet basis so that it can be further used efficiently in the thermal/thermochemical pretreatment stage.

The produced material is practically free of chlorine and alkali metals in the form of water soluble salts and salts of organic acids, which constitute the most active types of alkali metals that cause emission problems, corrosion/agglomeration and in some of the raw materials, may constitute the 100% of the existing quantity in them, while it contains significantly lower sulfur, phosphorus content that varies from 20%-80% of the initial content, as well as significantly lower content of heavy metals such as zinc, lead, copper, mercury and chromium (Cu, Pb, Zn, Cr, Hg), that varies from 20-90% of the initial content. The reduction rate of sulfur, phosphorus and heavy metals after the pretreatment of the final product depends on the type of the raw material and its ash composition. In particular, the reduction rate of these elements depends on the percentage of the water soluble and the combined with the organic material structure inorganic elements i.e. as carboxylic salts in conjunction with their total content in the raw material. In any case, all water soluble inorganic components as well as those which are able to give ion exchange reactions because of their presence in the organic structure of the raw materials are removed almost 100%. These inorganic components are the active components that cause the most important corrosion, deposition and agglomeration problems as well as gas emissions during the thermochemical conversion. Their removal leads to a significant reduction/elimination of the existing problems. The organic and/or inorganic solvent used as well as the new organic and/or inorganic salts and acids formed during the pretreatment are recovered during the drying process of the pretreated material and are separated/recycled in the process.

The recovery of the organic and/or inorganic components can be realized not only with the use of methods such as azeotropic distillation but also with the application of evaporation and condensation/sinking techniques. Moreover, the use of ion exchange resins can offer significant help to the recovery of useful materials and to the recycling of the active organic and/or inorganic components. The optimal method will depend on the type of the used/produced organic and/or inorganic components.

The aqueous residue that remains after the separation of the organic and/or inorganic compounds, which are used for preparation of the aqueous solution for the pretreatment of the various raw materials, is rich in alkali metals, chlorine, and phosphorus while it can be used as high quality fertilizer. In case of urban/industrial origin residues/wastes as well as sewage treatment plant sludges, it contains significant concentrations of heavy metals. The heavy metals should be removed first through sinking, coagulation processes and/or with the use of other available technologies before the aqueous residue is able to be used as fertilizer.

It is estimated that the physicochemical pretreatment of 100000 (one hundred thousand) tons of rural biomass with this specific technology may produce more than 1000 (thousand) tons of solid potassium, chlorine, phosphorus fertilizer.

The material produced after both pretreatments has the following characteristics: lower moisture and hydrophobic due to the destruction of hydrogen bonds during the thermal pretreatment in case of biomass, urban/industrial origin residues/wastes as well as sewage treatment plant sludges and due to the removal of a large portion of the moisture content, which can exceed 4 in case of coal and sewage treatment plant sludges. Reduced grinding resistance, pulverization easiness which facilitates the mixing with other materials (coal, biomass) are further characteristics of the pretreated material. Increased fixed carbon content and decreased volatile matter content, whereas the 80%-90% of the initial heating value is retained. After washing the pretreated material is free of chlorine and active forms of alkali metals and it contains significantly lower amounts of sulfur, phosphorus and heavy metals varying from 20-90% compared to the initial materials depending on their ash composition.

As a result almost zero (<0.01% ash basis) chlorine and active alkali metals (<0.1% ash basis) are noticed and therefore, corrosion problems, deposition and agglomeration due to chlorine, alkali metals and their compounds are avoided. Significantly reduced or even zero phosphorus, heavy metals (Cu, Pb, Zn, Cr, Hg), dioxins and furans emissions without the need for high cost technologies application, and consequently significantly lower cost and greater environmental protection is achieved resulting in the substantial reduction and/or elimination of the gas phase pollutants as well as of the corrosion, deposition, agglomeration problems caused by the alkali metals/chlorine/sulfur/phosphorus/heavy metals contained in the ash of various biomass types, low-quality coals, urban/industrial origin residues/wastes as well as sewage treatment plant sludges. The obtained results from the lab scale experiments have shown that chlorine and alkali metal emissions are always close to zero no matter what the treated raw materials are. Sulfur can be close to zero or significantly reduced compared to the initial raw material depending on the biomass types of agro/forest/urban origin, on the low-quality coals such as peat, lignite and sub-bituminous and bituminous coals, on urban/industrial origin residues/wastes and sewage treatment plant sludges as well as on their ash composition.

The following examples are presented in order to show the effect of the invention on rural origin biomass, on low quality coals such as lignites as well as on urban origin residues.

EXAMPLE 1

Olive kernel wood from an olive kernel oil production plant in Messinia (GR) is prepyrolysed at 300° C. for 1 h in a lab-scale fixed-bed reactor in nitrogen atmosphere. Subsequently, washing with an aqueous calcium acetate solution 10% (w/w) is applied for 1 h at a solid to liquid ratio 300 g/l using tap water, under constant stirring in a 2 L beaker and constant heating at 70° C. on a hotplate. After the pretreatment, the sample is filtered and dried at 50° C. Table 1 (see column denoted olive kernel wood-1) shows the composition of olive kernel wood before and after the pretreatment while Table 2 presents the composition of its ash content before and after the pretreatment. The analysis of the pretreated material shows an increase in the fixed carbon and heating value while the volatile matter and oxygen content is decreased. Ash analysis of the olive kernel wood showed that the pretreated material does not contain chlorine and alkali metals almost at all in water soluble and/or ion-exchange form, calcium concentration is increased, while sulfur concentration is considerably reduced compared to the initial material.

In addition to the previous pretreatment the olive kernel wood is prepyrolysed at 300° C. for 35 min in a lab-scale fixed-bed reactor in nitrogen atmosphere. Subsequently, washing with an aqueous calcium citrate solution 0.4% (w/w) is applied for 20 min ata solid to liquid ratio 150 g/l using deionized water, under constant stirring in a 2 L beaker and constant heating at 30° C. on a hotplate. After the pretreatment, the sample is filtered and dried at 50° C. Table 1 (see column denoted olive kernel wood-2) shows the composition of olive kernel wood before and alter the pretreatment while Table 2 presents the composition of its ash content before and after the pretreatment. The properties of the specific material is seen to be similar to those of previous olive kernel wood-1 material although the thermal treatment period now is half compared to the case of the olive kernel wood-1 material. Ash analysis of the olive kernel wood-2 material showed that the pretreated material does not contain chlorine and alkali metals almost at all in water soluble and/or ion-exchange form, calcium concentration is increased, while sulfur concentration is considerably reduced compared to the initial material.

EXAMPLE 2

Lignite from North Dakota (U.S.), which has high sodium and chlorine concentration, is pre-pyrolysed at 300° C. for 1 h in a lab-scale fixed-bed reactor in nitrogen atmosphere. Subsequently, washing with an aqueous calcium acetate solution 10% (w/w) is applied for 1 h at a solid to liquid ratio 350 g/l using tap water, under constant stirring in a 2 L beaker and constant heating at 70° C. on a hotplate, After the pretreatment, the sample is filtered and dried at 50° C. Table 1 shows the composition of the lignite sample before and after the pretreatment while table 2 presents the composition of its ash content before and after the pretreatment. Ash analysis of the lignite sample showed that the treated material does not contain chlorine and alkali metals at all, calcium concentration is in ed, while sulfur concentration is considerably reduced, compared to the initial material.

TABLE 1

Analysis and characterization of olive kernel wood and lignite
Pretreated olive kernel wood-1: prepyrolysed in 300° C. for 1 h
Pretreated olive kernel wood-2: prepyrolysed in 280° C. for 30 min

|  | Raw olive kernel wood | Pretreated olive kernel wood-1 | Pretreated olive kernel wood-2 | Raw lignite | Pretreated lignite |
|---|---|---|---|---|---|
| Proximate analysis (% d.b.) |  |  |  |  |  |
| Moisture | 9.5 | 2.56 | 2.45 | 21.3 | 5.15 |
| Ash | 4.60 | 5.58 | 5.3 | 12.25 | 10.01 |
| Volatile matter | 76.0 | 29.25 | 30.3 | 41.77 | 39.96 |
| Fixed carbon | 19.40 | 65.17 | 64.4 | 45.98 | 50.03 |
| Elemental analysis (% d.b.) |  |  |  |  |  |
| Carbon | 50.7 | 72.98 | 71.5 | 56.34 | 60.7 |
| Hydrogen | 5.89 | 3.51 | 3.71 | 4.46 | 3.58 |
| Nitrogen | 1.36 | 1.79 | 1.58 | 1.24 | 1.02 |
| Sulfur | 0.3 | 0.07 | 0.05 | 1.31 | 0.73 |
| Chlorine | 0.18 | <0.01 | <0.01 | 0.2 | <0.01 |
| Oxygen | 36.97 | 16.07 | 17.86 | 24.2 | 22.89 |
| Heating value | 21.21 | 28.2 | 28.00 | 23.68 | 24.34 |

TABLE 2

Ash analysis and characterization of olive kernel wood and lignite
Pretreated olive kernel wood-1: prepyrolysed in 300° C. for 1 h
Pretreated olive kernel wood-2: prepyrolysed in 2800° C. for 30 min

| Analysis % | Raw olive kernel wood | Pretreated olive kernel wood-1 | Pretreated olive kernel wood-2 | Raw lignite | Pretreated lignite |
|---|---|---|---|---|---|
| $SiO_2$ | 32.6 | 22.18 | 20.38 | 18.8 | 29.2 |
| MgO | 3.79 | 5.9 | 3.9 | 6.14 | 9.6 |
| $Al_2O_3$ | 2.96 | 4.3 | 6.15 | 6.9 | 12.1 |
| CaO | 10.22 | 43.8 | 33.4 | 18.3 | 23.4 |
| $Fe_2O_3$ | 1.9 | 1.35 | 1.3 | 15.16 | 9.1 |
| $TiO_2$ | 0.1 | 0.15 | 0.12 | 0.29 | 0.37 |
| $P_2O_5$ | 9.5 | 8.1 | 4.95 | 0.3 | 0.14 |
| $K_2O$ | 27.23 | 0.05 | 0.07 | 0.72 | 0.3 |
| $Na_2O$ | 4.17 | 0.01 | 0.015 | 10.15 | 0.05 |
| $SO_3$ | 4.97 | 2.48 | 2.41 | 21.61 | 15.93 |

EXAMPLE 3

A fraction, which contains mainly plastics/polymers as well as some paper, leather and inorganic materials, from partially treated solid urban wastes of Athens is considered. This fraction prepyrolysed at 300° C. for 1 h and then washed with an aqueous calcium acetate solution 2% (w/w) for 1.5 h at 70° C. at a solid-to liquid ratio 250 g/l using tap water under constant stirring in a 2 L beaker and constant heating at 70° C. on a hotplate. After the pretreatment, the sample is filtered and dried at 50° C. Table 3 shows the composition of the urban waste fraction before and after the pretreatments while Table 4 presents the composition of its ash content before and after pretreatment. Ash analysis of the sample showed that the pretreated material does not contain chlorine and alkali metals at all, while the concentrations of sulfur as well as of heavy metals are considerably reduced compared to the initial material.

TABLE 3

Analysis and characterization of urban wastes fraction

|  | Fraction of urban wastes | Pretreated fraction of urban wastes |
|---|---|---|
| Proximate analysis (% d.b.) | | |
| Moisture | 16.7 | 2.9 |
| Fixed carbon | 7.9 | 53.9 |
| Volatile matter | 80.8 | 32.9 |
| Ash | 11.3 | 13.2 |
| Elemental analysis (% d.b.) | | |
| Carbon | 47.6 | 69.09 |
| Hydrogen | 6.6 | 3.5 |
| Nitrogen | 0.2 | 0.15 |
| Sulfur | 0.3 | 0.16 |
| Oxygen | 38 | 13.9 |
| Heating value | 20.18 | 27.24 |

TABLE 4

Ash analysis and characterization of urban wastes fraction

| Analysis (%) | Fraction of urban wastes | Pretreated fraction of urban wastes |
|---|---|---|
| $SiO_2$ | 37.8 | 45.69 |
| MgO | 2.9 | 3.2 |
| $Al_2O_3$ | 24.7 | 18.6 |
| CaO | 16.9 | 24.5 |
| $Fe_2O_3$ | 1.3 | 0.97 |
| $TiO_2$ | 4.6 | 3.4 |
| $P_2O_5$ | 0.8 | 0.4 |
| $K_2O$ | 1.7 | <0.1 |
| $Na_2O$ | 4. | <0.1 |
| $SO_3$ | 5.8 | 3.24 |
| Cl | 3.8 | <0.01 |
| ZnO | 330 ppm | 185 ppm |
| PbO | 52.4 ppm | 37.4 ppm |
| $Cr_2O_3$ | 140 ppm | 105.8 ppm |
| CuO | 80 ppm | 63.5 ppm |

EXAMPLE 4

A number of rural wastes and residues which includes the olive kernel wood, the wheat straw, the by-product of bioethanol production from corn (DDGS) and the switchgrass suffer washing with an aqueous calcium acetate solution 3% (w/w) for 1 h at a solid-to liquid ratio 200 g/L using distilled water under constant stirring in a 2 L beaker and constant heating at 60-70° C. on a hotplate. After the pretreatment, the sample is filtered and dried at 50° C. Subsequently, the initial raw samples as well as the pretreated ones are ached in a high temperature oven at 600° C. Afterwards the produced ashes are heated up in the same high temperature oven so that their fusion point is determined. The heating process includes the ash heating at 800° C. initially for one hour and then the progressive heating at higher temperatures using a temperature step of 100° C. up to the determination of the fusion point, which is declared with the change in the natural shape of each sample and its vitrification. Table 5 presents the ash fusion points for the raw as well as for the pretreated biomass feedstock. As it can be seen in table 5, the ash fusion point of the pretreated materials is increased above 500° C. on average due to the removal of alkali metals, chlorine, sulfur and phosphorus during the pretreatment. The best thermal behavior is observed in case of wheat straw, which is considered the most difficult biomass feedstock for thermochemical conversion Worldwide.

TABLE 5

Thermal behavior of the ash from raw and pretreated biomass feedstock

| Ash samples | Fusion Point (° C.) |
|---|---|
| Raw olive kernel wood | 850 |
| Prertreated olive kernel wood | 1400 |
| Raw wheat straw | 800 |
| Pretreated wheat straw | 1500 |
| Raw DDGS | 8 |
| Pretreated DDGS | 1350 |
| Raw switchgrass | 850 |
| Pretreated switchgrass | 1400 |

EXAMPLE 5

A number of rural wastes and residues which includes the olive kernel wood, the wheat straw, the by-product of bioethanol production from corn (DDGS) and the switchgrass suffer washing with an aqueous solution 0.5% (w/w) of citric acid (80%) and magnesium citrate (20%) for 10 min at a solid-to liquid ratio 150 g/L, using distilled water under constant stirring in a 2 L beaker and constant heating at 20° C. on a hotplate. Furthermore, the olive kernel wood and the switchgrass suffer washing with an aqueous of aluminum acetate solution 0.5% (w/w) for 10 min at a solid-to liquid ratio 300 g/L in the case of the olive kernel wood and 150 g/L in the case of the switchgrass using distilled water under constant stirring in a 2 L beaker and constant heating at 20° C. on a hotplate. After the pretreatment, the sample is filtered and dried at 50° C. Subsequently, the initial raw samples as well as the pretreated ones are ashed in a high temperature oven at 600° C. Afterwards the produced ashes are heated up in the same high temperature oven so that their fusion point is determined. The heating process includes the ash heating at 800° C. initially for one hour and then the progressive heating at higher temperatures using a temperature step of 100° C. up to the determination of the fusion point, which is declared with the change in the natural shape of each sample and its vitrification. Table 6 presents the ash fusion points for the raw as well as for the pretreated biomass feedstock. As it can be seen in Table 6, the ash fusion point of the pretreated materials is increased above 500° C. on average due to the removal of alkali metals, chloride, sulfur and phosphorus during the pretreatment. When the aluminum acetate salt is used as the solvent for the extraction of the inorganic elements it is seen that the ash melting point of the olive kernel wood and the switchgrass increases an additional 150° C. compared with the case when the citric acid and magnesium citrate salt is use as well as the calcium acetate is used as it is described in Table 5 in example 4. In that case the ash melting temperature of the olive kernel wood and the switchgrass is seen to be even better compared to wheat straw as it is seen in Table 6.

TABLE 6

Thermal behavior of the ash from raw and pretreated biomass feedstock:
A) With citric acid and magnesium citrate (80/20%)
B) With aluminum acetate

| Ash samples | Fusion Point (° C.) |
| --- | --- |
| Raw olive kernel wood | 850 |
| Pretreated olive kernel wood (A) | 1400 |
| Pretreated olive kernel wood (B) | 1550 |
| Raw wheat straw | 800 |
| Pretreated wheat straw (A) | 1500 |
| Raw DDGS | 800 |
| Pretreated DDGS (A) | 1350 |
| Raw switchgrass | 850 |
| Pretreated switchgrass (A) | 1400 |
| Pretreated switchgrass (B) | 1550 |

The invention concerns a method for the removal of the harmful components which are included in raw materials, i.e. in biomass of agro/forest/urban origin, in low quality coals such as peat, lignite and sub-bituminous/bituminous coals, in urban/industrial origin residues/wastes and in sludges from sewage treatment plants. The removal is effected before the thermochemical incineration, combustion, gasification, pyrolysis of these materials.

The method may replace the hydrogen atoms in the structure of the carboxylic compound, which are found in the raw material with atoms of inorganic elements. The method removes the inorganic elements from the carboxylic compounds being present the raw material and replaces them with other elements.

During the physicochemical pretreatment of the raw materials, the materials are washed with an aqueous solution of organic and/or inorganic substances. Any water soluble calcium, magnesium, aluminum, titanium and ammonium salts may be used for the preparation of the aqueous solution for washing of the material. The salts may be combined with any water soluble organic acids, monocarbonic and/or polycarbonic, saturated and/or unsaturated, those having an aromatic ring as well as inorganic acids such as phosphoric acid and nitric acid. The proportions of the salts and acids are 0.1% to 30% weight in the aqueous solution.

The organic and/or inorganic acids and their water soluble salts can be mixed in proportions that vary from 0% up to 100% in order to form the active solvent that will be used in the preparation of the aqueous solution. In addition, they can be used for successive extractions so that the desired result is achieved.

The physicochemical stage is used for the production of clean materials with substantially lower problems during their hermochemical incineration, combustion, gasification and pyrolysis. In particular the application of a method according to the invention results in materials that show very low to zero corrosion, deposition and ash agglomeration problems, very low to zero gas emissions (potassium, sodium, chlorine, sulfur and phosphorus) and heavy metals (Cu, Pb, Zn, Cr, Hg), during the thermochemical incineration, combustion, gasification, pyrolysis of the raw materials,

I claim:

1. A method for the removal of inorganic components from raw material for the production of clean materials, wherein the inorganic components for removal are alkali metals, sulfur, phosphorus, heavy metals or chlorine and wherein the raw material is biomass waste, coal waste, municipal solid waste, industrial organic waste, residues from agricultural origin, residues from urban origin, residues from industrial origin, waste from urban origins, waste from industrial origins, sludge from sewage treatment plants, or any combination thereof, the method comprising:
preparing an aqueous salt solution, wherein the aqueous salt solution comprises distilled water, deionized water or water from a public water system, spring, river or lake, and organic and/or inorganic salts containing at least one of calcium, magnesium, aluminum, titanium, ammonium cations, or combinations thereof, and wherein the salt is in a concentration of 0.1% to 30% w/w in water volume,
washing the raw material with the aqueous salt solution, wherein the washing is performed at temperatures ranging from 13° C. to 95° C., and washing is performed for a period of 5 minutes to 24 hours, and
wherein the alkali metals, sulfur, phosphorous, heavy metals or chlorine are replaced by calcium, magnesium, aluminum, ammonium or titanium ions.

2. The method as set forth in claim 1, wherein the raw material is biomass waste, coal waste, municipal solid waste, industrial organic waste, residues from agricultural origin, residues from urban origin, residues from industrial origin, waste from urban origins, waste from industrial origins, sludge from sewage treatment plants, or any combination thereof and comprises at least a carboxylic compound containing hydrogen and wherein the carboxylic compound constitutes part of the structure of the raw material, the method further comprising replacing the hydrogen atoms in the structure of the carboxylic compound with atoms of inorganic elements by means of an ion exchange reaction between the atoms of the inorganic element and the hydrogen atoms.

3. The method as set forth in claim 1, wherein the concentration of salt in the aqueous salt solution is in the range of 0.1% to 2% w/w in water volume.

4. The method as set forth in claim 1, wherein the aqueous salt solution further comprises one or more acids wherein the one or more acids are organic acids, inorganic acids, and combinations thereof.

5. The method as set forth in claim 1, wherein the aqueous salt solution comprises at least one of calcium acetate salts, magnesium acetate salts, aluminum acetate salts, ammonium acetate salts, titanic acetate salts, or combinations thereof.

6. Method according to claim 1, whereby washing of the raw material s carried out with aqueous solution that contains organic and/or inorganic salts and organic and/or inorganic acids and whereby the concentration of the salts and the acids in the aqueous solution varies from 0.1% up to 2% w/w in water volume.

7. The method as set forth in claim 4, wherein the acid is at least one of citric acid, malic acid, benzoic acid, phosphoric acid, nitric acid, or combinations thereof.

8. The method as set forth in claim 1, wherein the washing is performed at a ratio of raw material to aqueous solution in the range of 33 g/l to 600 g/l.

9. The method as set forth in claim 1, wherein the washing is performed at a ratio of raw material to aqueous solution in the range of 150 g/l to 400 g/l.

10. The method as set forth in claim 1, wherein the washing is performed at temperatures ranging from 55° C. to 80° C.

11. The method as set forth in claim 1, wherein the washing is performed for a period of 10 minutes to 35 minutes.

12. The method as set forth in claim 1, wherein the washing is performed in different aqueous solutions in succession.

13. The method as set forth in claim 1, further comprising thermally treating the raw material wherein the raw material is biomass waste, coal waste, municipal solid waste, industrial organic waste, residues from agricultural origin, residues from urban origin, residues from industrial origin, waste from urban origins, waste from industrial origins, sludge from sewage treatment plants, or any combination thereof.

14. The method as set forth in claim 13, wherein the thermal treatment is performed prior to washing of the raw material.

15. The method as set forth in claim 13 wherein the thermal treatment is performed after washing of the raw material.

16. The method as set forth in claim 13, wherein the thermal treatment is performed in a nitrogen atmosphere and in the absence of air, at temperatures of 250° C. to 350° C. for a residence time at the temperature range from 5 minutes to 2 hours.

17. The method as set forth in claim 13, wherein the thermal treatment is performed for a residence time at the temperature range from 5 minutes to 40 minutes, and wherein the moisture of the raw material is less than 30% in wet basis.

18. The method as set forth in claim 13, wherein the thermal treatment is performed in a nitrogen atmosphere and with the presence of oxygen and/or air, which is limited in less than 40% of the amount that is required for the stoichiometric combustion of these materials.

19. Method according to claim 1, whereby the raw material consists of particles, whose size is smaller than 10 cm.

* * * * *